(12) United States Patent
Mihara et al.

(10) Patent No.: US 8,451,523 B2
(45) Date of Patent: May 28, 2013

(54) LIGHT SOURCE DEVICE AND OPTICAL SCANNER

(75) Inventors: Jun Mihara, Nagoya (JP); Taizo Matsuura, Ama (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 139 days.

(21) Appl. No.: 13/070,651

(22) Filed: Mar. 24, 2011

(65) Prior Publication Data

US 2011/0292481 A1   Dec. 1, 2011

(30) Foreign Application Priority Data

May 28, 2010  (JP) ................. 2010-123178

(51) Int. Cl.
  *G02B 26/08*  (2006.01)
(52) U.S. Cl.
  USPC ........................................ 359/215.1
(58) Field of Classification Search
  USPC ...................... 359/823, 826, 215.1
  See application file for complete search history.

(56) References Cited

U.S. PATENT DOCUMENTS

| 6,283,371 | B1 * | 9/2001 | Son .............. 359/826 |
| 7,371,013 | B2 | 5/2008 | Nagano et al. |
| 2002/0015090 | A1 | 2/2002 | Suzuki et al. |
| 2006/0215966 | A1 | 9/2006 | Nagano et al. |
| 2009/0296399 | A1 | 12/2009 | Matsuura |

FOREIGN PATENT DOCUMENTS

| JP | 07-068836 A | 3/1995 |
| JP | 07-325241 | 12/1995 |
| JP | 08-184735 | 7/1996 |
| JP | 10-041588 | 2/1998 |
| JP | 2000-101179 A | 4/2000 |
| JP | 2001-066538 A | 3/2001 |
| JP | 2002-031772 | 1/2002 |
| JP | 2002-258186 A | 9/2002 |
| JP | 2004-355007 A | 12/2004 |
| JP | 2005-294708 A | 10/2005 |
| JP | 2006-267237 A | 10/2006 |
| JP | 2008-268348 A | 11/2008 |
| JP | 2009-098542 A | 5/2009 |
| JP | 2009-288506 A | 12/2009 |

OTHER PUBLICATIONS

JP Office Action mailed Apr. 17, 2012, JP Appln. 2010-123178, English translation.
Notification of Reason for Refusal with English translation issued in corresponding Japanese Patent Application 2010-123178 dated Aug. 21, 2012.

\* cited by examiner

*Primary Examiner* — Euncha Cherry
(74) *Attorney, Agent, or Firm* — Banner & Witcoff, LTD (57) ABSTRACT

A light source device includes a light source, a coupling lens configured to convert light emitted from the light source into a beam of light, a holding member configured to hold the coupling lens, and a frame to which the holding member is fixed. The holding member includes a tubular main body portion for holding the coupling lens, and a pair of first protrusions sticking out from an outer peripheral surface of the main body portion. The pair of first protrusions have fixing surfaces lying in the same plane and fixed to the frame.

11 Claims, 7 Drawing Sheets

LIGHT SOURCE DEVICE AND OPTICAL SCANNER

CROSS-REFERENCE TO RELATED APPLICATION(S)

This application claims priority from Japanese Patent Application No. 2010-123178 filed on May 28, 2010, the disclosure of which is incorporated herein by reference in its entirety.

TECHNICAL FIELD

The present invention relates to a light source device and an optical scanner.

BACKGROUND ART

An image forming apparatus such as a laser printer generally includes an optical scanner for exposing the surface of a photoconductor drum with light. As an example of a light source device provided in the optical scanner, a known light source device includes a light source (e.g., a semiconductor laser), a coupling lens (e.g., a collimating lens) for converting a laser beam into a beam of light, a barrel portion for supporting the light source, and a tubular holding member (e.g., a lens holder) for holding the coupling lens.

In a light source device, it is necessary to accurately position a light source and a coupling lens. To achieve this, for example, ultraviolet cure adhesive is applied to the outer peripheral surface of the barrel portion, and the holding member is inserted onto the barrel portion and then moved in both axial and peripheral direction to adjust the focal point of the coupling lens. Thereafter, the adhesive is irradiated and cured with ultraviolet light so that the positions of the light source and the coupling lens are fixed.

However, according to the conventional light source, the adhesive is coated on the outer peripheral surface of the barrel portion, and therefore the entire circumference of the barrel portion needs to be irradiated with ultraviolet light. This disadvantageously requires a time-consuming adhesive curing operation. Further, in order to accurately position the light source and the coupling lens, it is necessary that the adhesive be coated uniformly on the entire circumference of the barrel portion, which is not easy to perform.

In view of the above, it would be desirable to accurately and easily position the light source and the coupling lens.

SUMMARY OF THE INVENTION

According to a first aspect of the present invention, there is provided a light source device comprising: a light source; a coupling lens configured to convert light emitted from the light source into a beam of light; a holding member configured to hold the coupling lens; and a frame to which the holding member is fixed, wherein the holding member comprises a tubular main body portion for holding the coupling lens, and a pair of first protrusions sticking out from an outer peripheral surface of the main body portion; and wherein the pair of first protrusions have fixing surfaces lying in the same plane and fixed to the frame.

According to a second aspect of the present invention, there is provided an optical scanner comprising: the aforementioned light source device; a light deflector configured to deflect a beam of light from the light source device and rapidly sweep with the beam of light; a scanning lens disposed to allow the beam of light deflected by the light deflector to pass through; a base frame shaped like a box and configured to support therein the light source device; and a lid frame attached to and covering the base frame.

BRIEF DESCRIPTION OF THE DRAWINGS

To better understand the claimed invention, and to show how the same may be carried into effect, reference will now be made, by way of example only, to the accompanying drawings, in which:

DESCRIPTION OF EMBODIMENTS

A detailed description will be given of illustrative embodiments of the present invention with reference to the accompanying drawings. In the following description, a general arrangement of an image forming apparatus provided with an optical scanner according to one embodiment of the present invention will be described, and thereafter the detailed structure of the optical scanner will be described.

<General Arrangement of Laser Printer>

Figure 1:
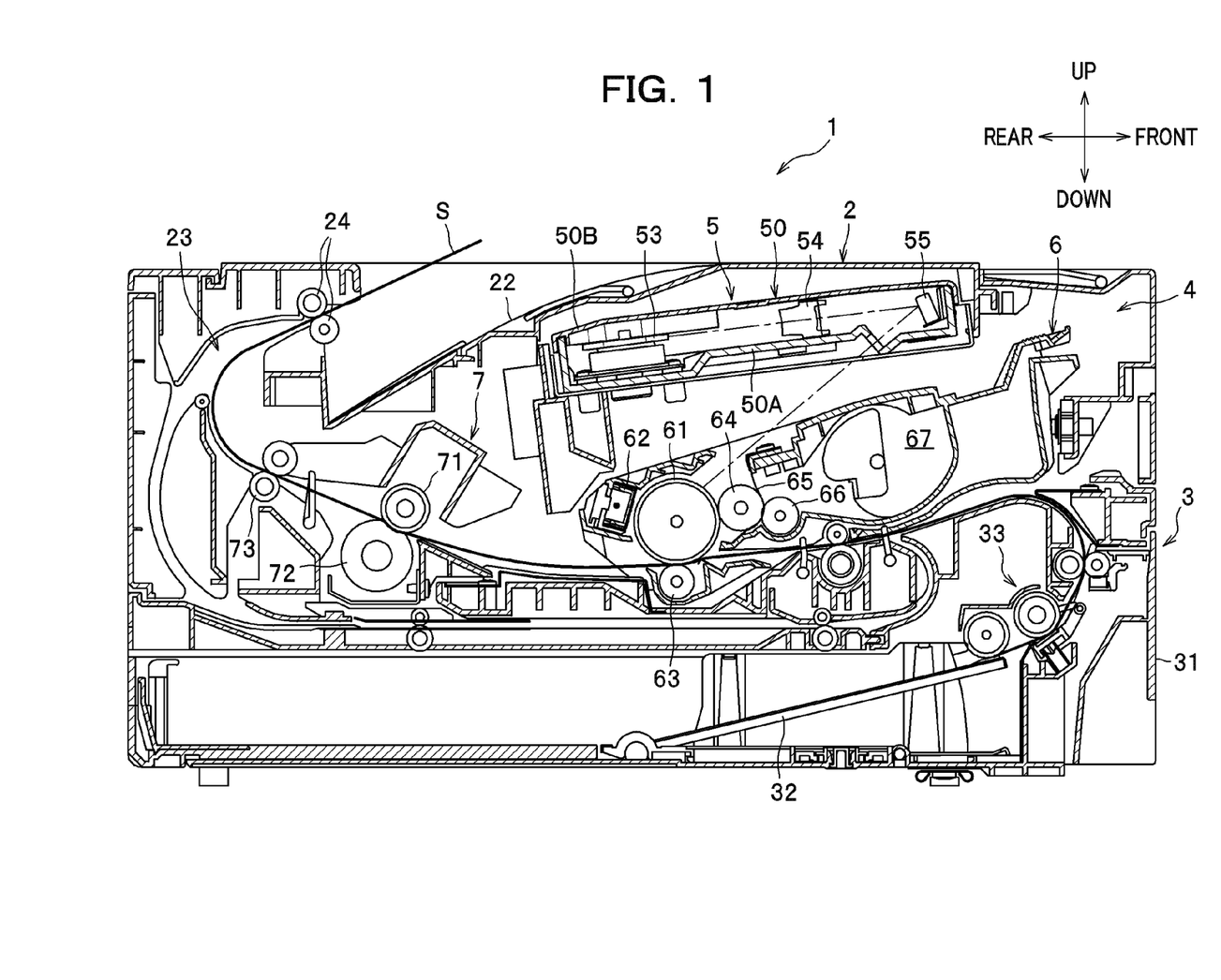
FIG. 1 is a schematic diagram of a laser printer provided with an optical scanner according to one exemplary embodiment.

As shown in FIG. 1, a laser printer 1 (i.e., image forming apparatus) comprises a body casing 2, and several components housed within the body casing 2 which principally include a sheet feeder unit 3 for feeding a sheet S (e.g., of paper), and an image forming unit 4 for forming an image on the sheet S.

Hereinbelow, in describing the general arrangement of the laser printer 1, the direction is designated as from the viewpoint of a user who is using (operating) the laser printer 1. To be more specific, in FIG. 1, the right-hand side of the drawing sheet corresponds to the "front" side of the laser printer, the left-hand side of the drawing sheet corresponds to the "rear" side of the laser printer, the front side of the drawing sheet corresponds to the "left" side of the laser printer, and the back side of the drawing sheet corresponds to the "right" side of the laser printer. Similarly, the direction extending from top to bottom of the drawing sheet corresponds to the "vertical" or "up/down (upper/lower or top/bottom)" direction of the laser printer.

The sheet feeder unit 3, provided in a lower space within the body casing 2, principally includes a sheet feed tray 31, a sheet pressure plate 32, and a sheet feed mechanism 33. Sheets S stored in the sheet feed tray 31 are urged upward by the sheet pressure plate 32, and then supplied to the image forming unit 4 by the sheet feed mechanism 33.

The image forming unit 4 principally includes an optical scanner 5, a process cartridge 6, and a fixing device 7.

The optical scanner 5 is arranged in the body casing 2 at an upper part thereof, and configured to emit a laser beam (see chain lines) based on image data so that the surface of a photoconductor drum 61 is exposed to light to form an electrostatic latent image on the surface of the photoconductor drum 61. Detailed structure of the optical scanner 5 will be described later.

The process cartridge 6 is disposed below the optical scanner 5 within the body casing 2, and configured to be attached to or detached from the body casing 2 through an opening formed when a front cover (reference numeral omitted) provided at the body casing 2 is swung open. The process cartridge 6 principally includes a photoconductor drum 61, a charger 62, a transfer roller 63, a developing roller 64, a doctor blade 65, a supply roller 66, and a toner reservoir 67 for storing toner (developer).

In the process cartridge 6, the surface of the photoconductor drum 61 is uniformly charged by the charger 62, and then exposed to a rapidly sweeping laser beam from the optical scanner 5 so that an electrostatic latent image based upon image data is formed on the photoconductor drum 61. Meanwhile, toner in the toner reservoir 67 is supplied via the supply roller 66 to the developing roller 64, and goes through between the developing roller 64 and the doctor blade 63 so that a thin layer of toner having a predetermined thickness is carried on the developing roller 65.

The toner carried on the developing roller 64 is supplied from the developing roller 64 to the electrostatic latent image formed on the photoconductor drum 61. Accordingly, the electrostatic latent image is visualized and a toner image is formed on the photoconductor drum 61. Thereafter, while a sheet S is conveyed through between the photoconductor drum 61 and the transfer roller 63, the toner image on the photoconductor drum 61 is transferred onto the sheet S.

The fixing device 7 is provided rearwardly of the process cartridge 6, and principally includes a heating roller 71, and a pressure roller 72 positioned opposite to the heating roller 71 and pressed against the heating roller 71. In the fixing device 7, the toner image transferred onto the sheet S is thermally fixed on the sheet S while passing through between the heating roller 71 and the pressure roller 72. The sheet S with the toner image thermally fixed thereon is conveyed by conveyor rollers 73 along a conveying path 23, and ejected from the conveying path 23 onto a sheet output tray 22 by eject rollers 24.

<Detailed Structure of Optical Scanner>

Figure 2:
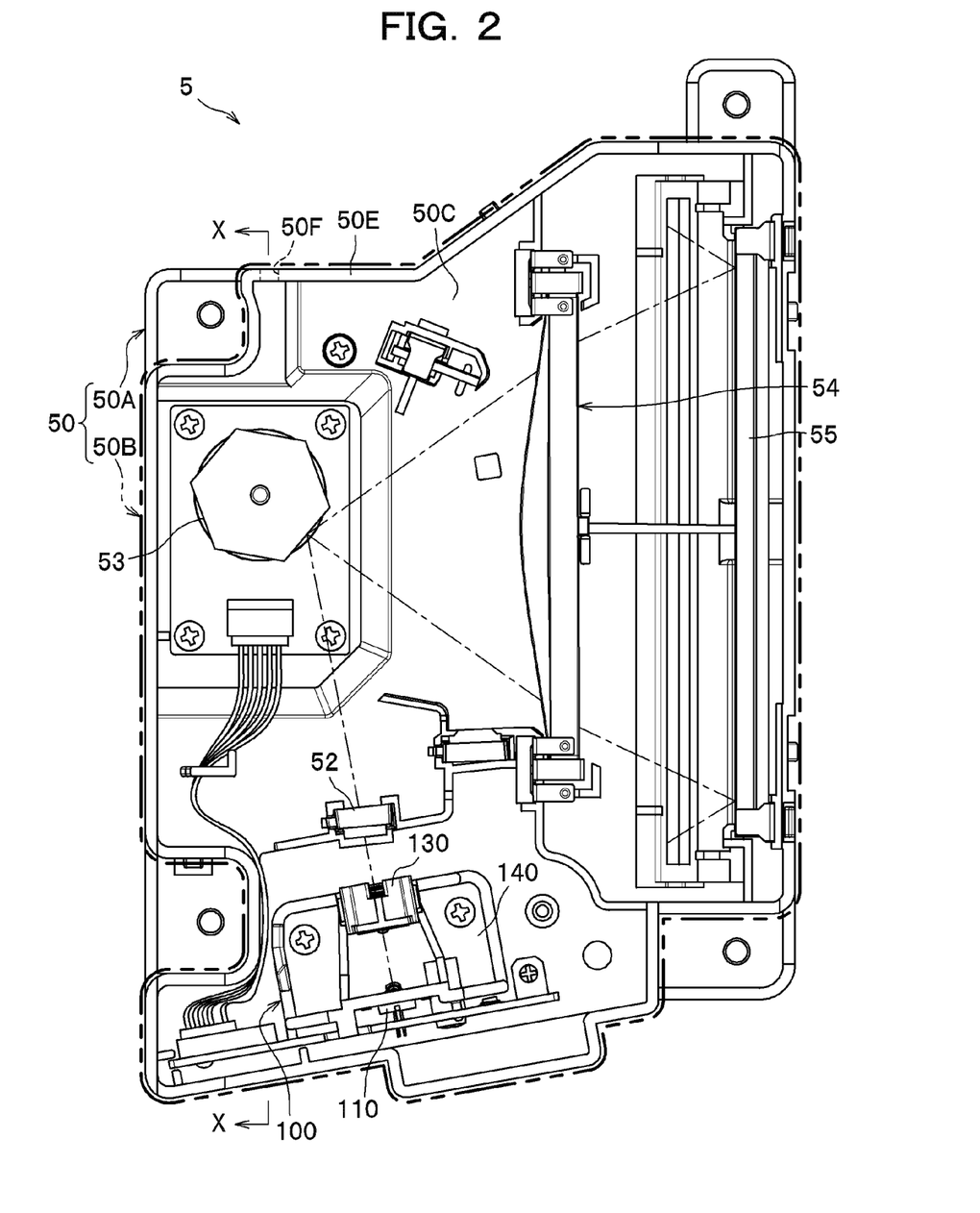
FIG. 2 is a top view of the optical scanner.

As seen in FIG. 2, the optical scanner 5 comprises a scanner casing 50, and several components housed within the scanner casing 50 which principally include a light source device 100, a cylindrical lens 52, a polygon mirror 53 as an example of a light deflector, a scanning lens 54, and a reflecting mirror 55.

The light source device 100 includes a semiconductor laser 110 as an example of a light source for emitting a laser beam (i.e., light), and a coupling lens 120 (see FIG. 3) configured to condense the laser beam from the semiconductor laser 110 and convert it into a parallel beam of light. Detailed structure of the light source device 100 will be described later.

The cylindrical lens 52 is a lens through which a laser beam emitted from the light source device 100 toward the polygon mirror 53 passes. The cylindrical lens 52 refracts the laser beam emitted from the light source device 100 and converges the laser beam in a sub-scanning direction (i.e., direction orthogonal to a main scanning direction) to condense it onto the polygon mirror 53 (i.e., reflecting surfaces thereof).

The polygon mirror 53 is shaped like a hexagonal column having six sides constituting reflecting surfaces. The polygon mirror 53 spins at high speed and reflects a laser beam from the light source device 100, so that the laser beam is deflected in the main scanning direction (i.e., up-and-down direction of FIG. 2) and swept out at a constant angular velocity.

The scanning lens 54 is a lens through which the laser beam deflected and swept out by the polygon mirror 53 passes. The scanning lens 54 converts the laser beam that has been swept out by the polygon mirror 53 at a constant angular velocity into a laser beam that sweeps at a constant linear velocity. The scanning lens 54 also refracts the laser beam that has been reflected by the polygon mirror 53 so the laser beam is converged in the sub-scanning direction and condensed on the surface of the photoconductor drum 61, to thereby correct an optical face tangle error of the polygon mirror 53.

The reflecting mirror 55 reflects the laser beam that has passed through the scanning lens 54 toward the photoconductor drum 61 (see also FIG. 1).

In the optical scanner 5, the laser beam emitted from the light source device 100 and based on image data is reflected by or passes through the cylindrical lens 52, the polygon mirror 53, the scanning lens 54, and the reflecting mirror 55, in this order, so that the peripheral surface of the photoconductor drum 61 is rapidly scanned with the laser beam (see FIG. 1). Accordingly, the surface of the photoconductor drum 61 is exposed to the laser beam, and an electrostatic latent image based on the image data is formed on the surface of the photoconductor drum 61.

The scanner casing 50 is a casing configured to house several components such as the light source device 100, the polygon mirror 53, and the scanning lens 54. As seen in FIG. 1, the scanner casing 50 principally includes a box-like base frame 50A having an open top, and a lid frame 50B attached to and covering the base frame 50A.

Figure 3:
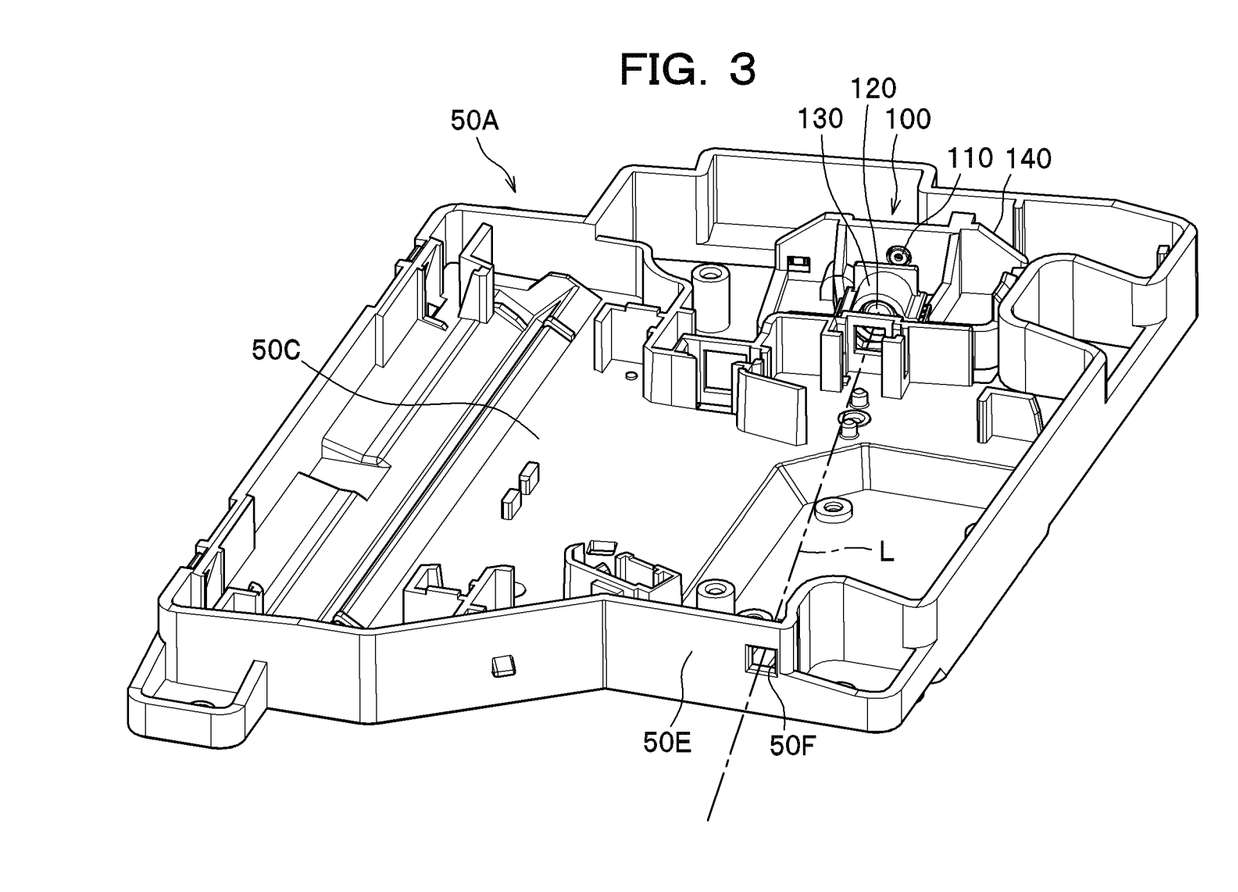
FIG. 3 is a perspective view of a base frame.

The base frame 50A is configured to support therein the light source device 100, the polygon mirror 53, etc. As best seen in FIGS. 2 and 3, the base frame 50A has a wall 50E upwardly extending from the edge of an bottom wall portion 50C and positioned opposite to the light source device 100 with the polygon mirror 53 (illustration omitted in FIG. 3) interposed therebetween in the main scanning direction.

The wall 50E has an opening 50F through which the interior of the base frame 50A is in communication with the exterior of the base frame 50A, and during assembly of the optical scanner 5 (i.e., alignment of the semiconductor laser 110 and the coupling lens 120 as described later), a laser beam L from the light source device 100 is caused to pass through the opening 50F.

Figure 4:
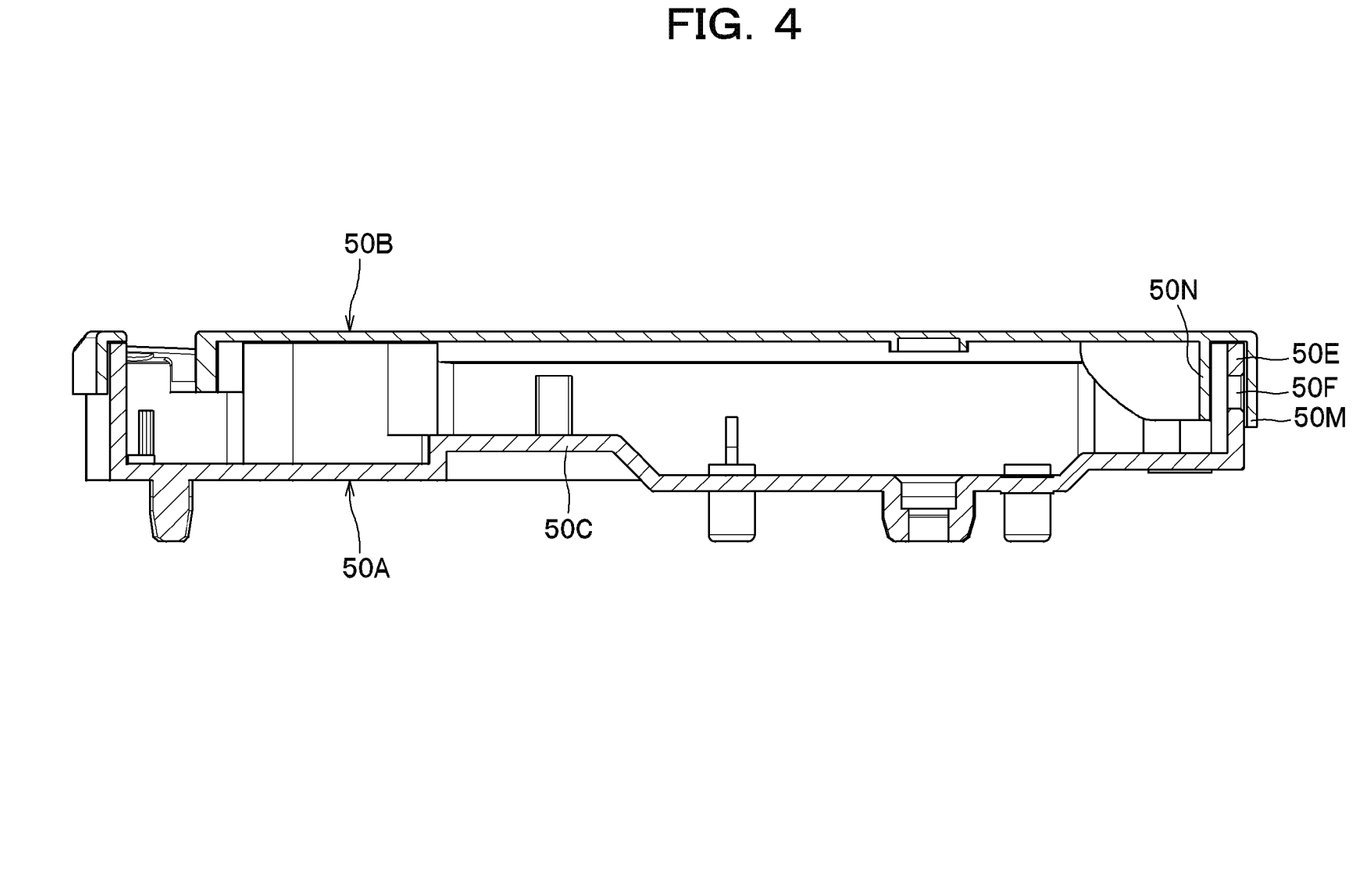
FIG. 4 is a sectional view taken along the lines X-X of FIG. 2.

As best seen in FIG. 4, the lid frame 50B has a pair of shielding walls 50M, 50N disposed opposite to each other and extending toward the bottom wall portion 50C of the base frame 50A so as to sandwich the wall 50E. When the lid frame 50B is attached to the base frame 50A, the shielding wall 50M covers (closes) the opening 50F from outside the base frame 50A, whereas the shielding wall 50N covers the opening 50F from inside the base frame 50A.

Providing the pair of shielding walls 50M, 50N makes it possible to cover the opening 50F from both sides of the wall 50E (i.e., inside and outside of the wall 50E). This can reduce air flow between the interior and the exterior of the scanner casing 50, to thereby restrict dust from entering the scanner casing 50. As a result, dust resistance of the optical scanner 5 can be improved.

<Detailed Structure of Light Source Device>

Detailed structure of the light source device 100 will be described below. In the following description, the term "optical axis direction" indicates a direction along an optical axis of the semiconductor laser 110 (i.e., direction along which the laser beam travels). See the direction along which the chain line extends in FIG. 6B.

Figure 5A:
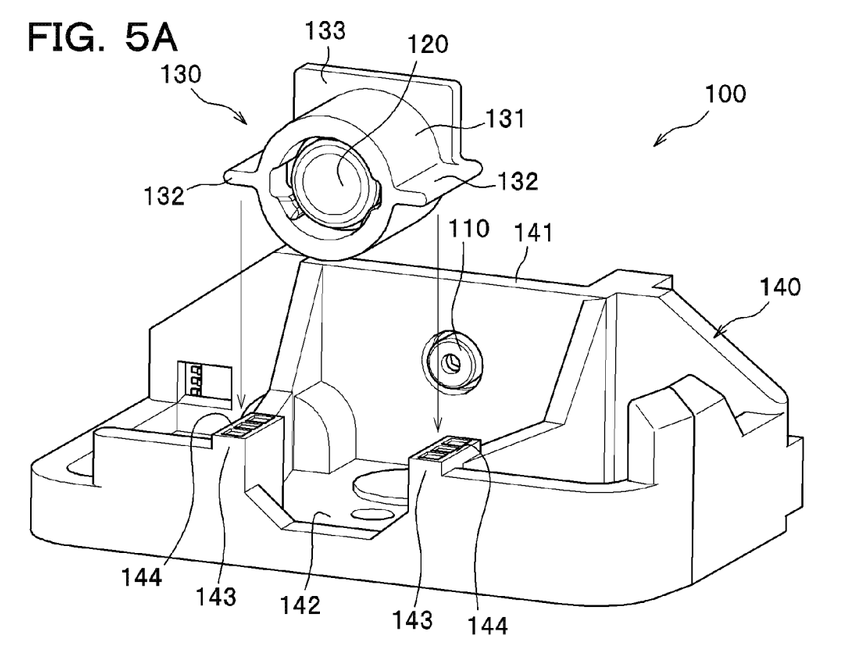
FIG. 5A is a perspective view of the light source device illustrating a state before a holding member for holding a coupling lens is fixed to a frame.
Figure 5B:
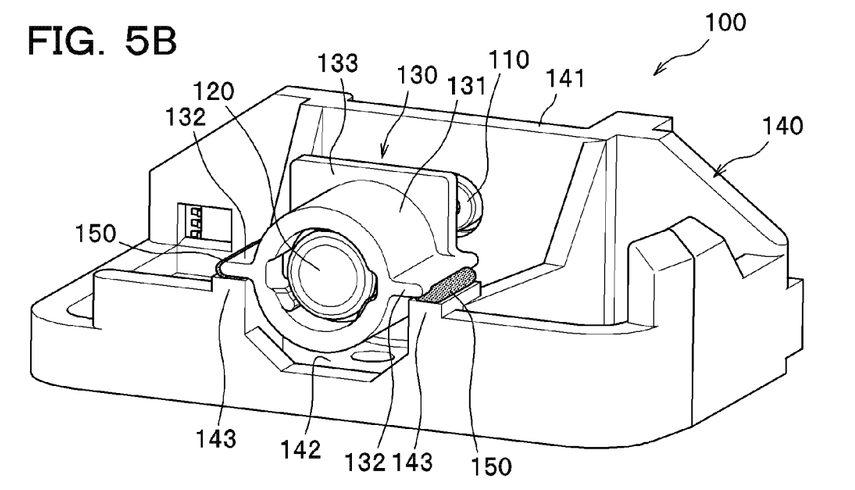
FIG. 5B is a perspective view of the light source device illustrating a state in which the holding member is fixed to the frame.

As best seen in FIG. 5, the light source device 100 principally includes the semiconductor laser 110 (i.e., light source), the coupling lens 120, a holding member 130 configured to hold the coupling lens 120, and a frame 140 to which the semiconductor laser 110 and the holding member 130 are fixed.

Figure 6A:
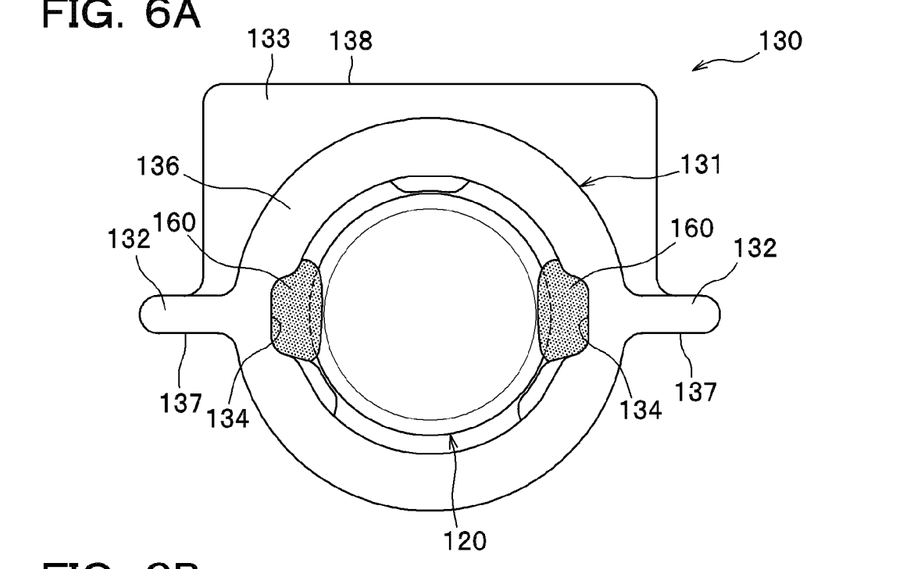
FIG. 6A is a front view of the holding member.
Figure 6B:
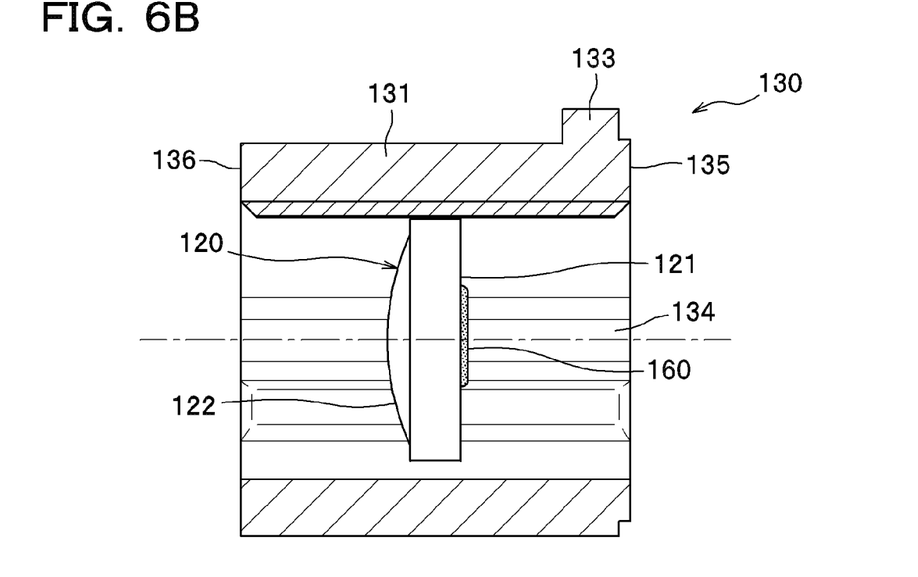
FIG. 6B is a longitudinal sectional view of the holding member.

The coupling lens 120 is a convex lens made of resin or glass. As described above, the coupling lens 120 converts a laser beam emitted from the semiconductor laser 110 into a parallel beam of light. As best seen in FIG. 6B, the coupling lens 120 is shaped such that a light-incident surface 121 as an example of one lens surface is a flat surface and a light-emitting surface 122 as an example of the other lens surface defines a convex curve.

As seen in FIGS. 5A and 5B, the holding member 130 is made of resin or the like which transmits ultraviolet light. The holding member 130 principally includes a tubular main body portion 131, a pair of (i.e., two) first protrusions 132 sticking out from the outer peripheral surface (reference numeral omitted) of the main body portion 131, and a second protrusion 133 sticking out from the outer peripheral surface of the main body portion 131.

The main body portion 131 is a substantially cylinder-shaped portion configured to hold the coupling lens 120. As best seen in FIG. 6A, the main body portion 131 has a pair of groove-shaped recess portions 134 on the inner peripheral surface (reference numeral omitted) thereof at positions corresponding to the pair of first protrusions 132. The coupling lens 120 is fixed to the inner peripheral surface of the main body portion 131 by adhesive 160 applied to the recess portions 134, so that the holding member 130 holds the coupling lens 120.

As seen in FIG. 6B, both end faces (i.e., incident-side end surface 135 and emission-side end surface 136) of the main body portion 131 in the optical axis direction (see right-and-left direction of FIG. 6B) define surfaces orthogonal to the optical axis direction. Therefore, the incident-side end surface 135 and the emission-side end surface 136 are parallel to each other. According to this embodiment, the coupling lens 120 is fixed to (i.e., held in) the main body portion 131 after the light-incident surface 121 in the shape of a flat surface is adjusted to be parallel to the incident-side end surface 135 and the emission-side end surface 136.

As seen in FIGS. 5A, 5B and 6A, the pair of first protrusions 132 are rib-shaped portions sticking out from the outer peripheral surface of the main body portion 131 at two positions, namely, extending radially outward (i.e., in a direction orthogonal to the optical axis direction) at two diametrically opposite positions with the center point of a substantially circular section of the main body portion 131 disposed therebetween and longitudinally extending along the optical axis direction. In other words, according to this embodiment, the pair of first protrusions 132 are arranged on the line passing through the center line of the main body portion 131 and extending orthogonal to the optical axis direction.

Each of the first protrusions 132 has a fixing surface 137 at a lower side in an up-and-down direction as shown in FIG. 6A; the fixing surface 137 is substantially in the shape of a planar surface that is fixed to the frame 140 by adhesive 150. The two fixing surfaces 137 of the pair of first protrusions 132 lie in the same plane. According to this embodiment, each of the first protrusions 132 extends along the optical axis direction, and the fixing surface 137 is defined as a substantially elongated rectangular flat surface extending along the optical axis direction.

A second protrusion 133 is a half flange-shaped portion sticking out from the outer peripheral surface of the main body portion 131 at an end portion positioned on the incident-side end surface 135; the second protrusion 133 extends in a direction orthogonal to both of the optical axis direction and the direction along which the pair of first protrusions 132 are arranged in line, upward from the surfaces opposite to the fixing surfaces 137. The second protrusion 133 has a protrusive end surface (i.e., end face) 138 that defines a surface parallel to the fixing surfaces 137 of the pair of first protrusions 132. Further, the protrusive end surface 138 is orthogonal to the incident-side end surface 135 and the emission-side end surface 136 of the main body portion 131, which are parallel to each other.

As best seen in FIGS. 5A and 5B, the frame 140 is made, for instance, of resin. The frame 140 principally includes a light source holding wall 141, a bottom wall 142 extending from the lower end of the light source holding wall 141 in the traveling direction of the laser beam, and a pair of holding member fixing portions 143 provided at front center portions of the bottom wall 142.

The light source holding wall 141 has a through-hole (reference numeral omitted) at a center part thereof, and the semiconductor laser 110 is fixed in this through-hole, for instance, by press fitting.

The bottom wall 142 has screw holes (not shown) so that the frame 140 is fixed to the bottom wall portion 50C of the base frame 50A by screws.

The holding member fixing portions 143 are spaced apart from each other in a direction orthogonal to the optical axis direction, and the upper surfaces thereof define frame-side fixing surfaces 144 for fixing the holding member 130. To be more specific, the distance between the holding member fixing portions 143 is greater than the outer diameter of the main body portion 131 of the holding member 130.

By this configuration, an interference between the outer peripheral surface of the main body portion 131 and the holding member fixing portions 143 can be avoided when the holding member 130 is fixed to the holding member fixing portions 143 (i.e., frame-side fixing surfaces 144). In other words, the holding member 130 is fixed to (supported on) the frame-side fixing surfaces 144 only through the first protrusions 132.

The frame-side fixing surface 144 is a substantially rectangular surface longitudinally extending along the optical axis direction. For the purpose of fixing the holding member 130, a known adhesive 150 is applied to the frame-side fixing surface 144; the adhesive 150 is cured by irradiation of ultraviolet light (i.e., light curing resin).

Since a plurality of recess portions (reference numeral omitted) are formed in the frame-side fixing surface 144, oozing of the adhesive 150 can be prevented during application of the adhesive 150. Once the adhesive 150 is cured, the recess portions work as a physical resistance and prevent the holding member 130 from coming off and dropping from the frame-side fixing surface 144.

<Manufacturing method for Light Source Device>

Manufacturing method (i.e., assembly process) for the light source device 100 will be described below. An assembly of the light source device 100 according to this embodiment is carried out at an attachment stage of the light source device 100 to the base frame 50A in the manufacturing process for the optical scanner 5.

As seen in FIG. 5A, the semiconductor laser 110 is fixed to the light source holding wall 141 of the frame 140, for instance, by press fitting. Further, as seen in FIGS. 6A and 6B, the coupling lens 120 is fixed to the holding member 130 by adhesive 160 such that the light-incident surface 121 becomes parallel to the incident-side end surface 135 and the emission-side end surface 136 of the holding member 130.

Figure 7A:
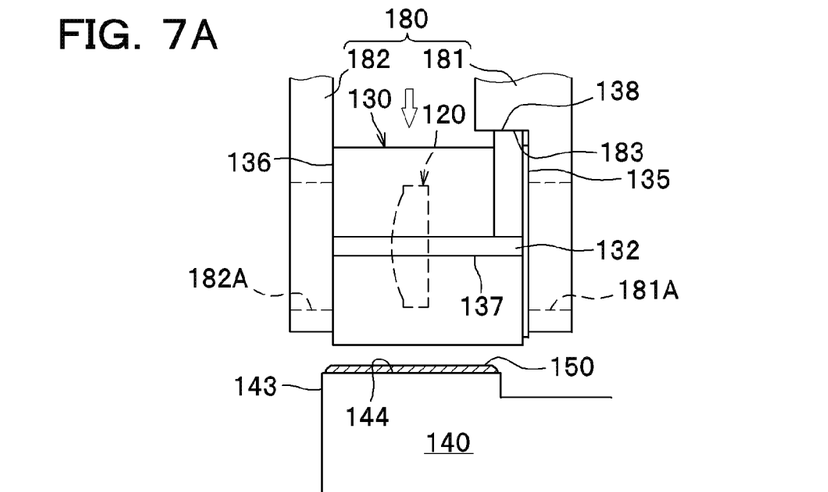
FIGS. 7A to 7C are explanatory views illustrating an assembly process of the light source device.

Next, the frame 140 to which the semiconductor laser 110 has been fixed is attached to the bottom wall portion 50C of the base frame 50A by screws. Thereafter, as best seen in FIG. 7A, adhesive 150 is uniformly applied to the frame-side fixing surfaces 144 of the frame 140.

The assembly of the holding member 130 and the coupling lens 120 is held by an arm 180 from both ends of the holding member 130 in the optical axis direction. The arm 180 moves the fixing surfaces 137 of the holding member 130 toward the frame-side fixing surfaces 144 of the frame 140, during which the semiconductor laser 110 is caused to emit a laser beam L. The arm 180 causes the fixing surfaces 137 (i.e., the holding member 130) to approach the frame-side fixing surfaces 144 until the fixing surfaces 137 reach a position in which the laser beam L passes through the coupling lens 120.

It is to be noted that the arm 180 is an arm provided in an assembling apparatus (for assembling the light source device 100) for positioning the holding member 130 in the frame 140 to place the semiconductor laser 110 and the coupling lens 120 in proper alignment. The arm 180 includes an incident-side arm 181 which abuts on the holding member 130 from the incident-side end surface 135 and an emission-side arm 182 which abuts on the holding member 130 from the emission-side end surface 136.

A planar abutment surface 183 is formed on the incident-side arm 181. When the arm 180 holds the holding member 130, the abutment surface 183 is first brought into contact with the protrusive end surface 138 of the holding member 130 and then the arm 180 holds the holding member 130.

The incident-side arm 181 and the emission-side arm 182 have an opening 181A and an opening 182A, respectively, so that during alignment of the semiconductor laser 110 and the coupling lens 120, the laser beam L emitted from the semiconductor laser 110 can pass through the opening 181A, the holding member 130 (i.e., the coupling lens 120), and the opening 182A.

As best seen in FIG. 3, the laser beam L from the semiconductor laser 110 having passed through the coupling lens 120 passes through the opening 50F formed in the wall 50 of the base frame 50A, and enters a measurement device (not shown) installed outside the base frame 50A.

Figure 7B:
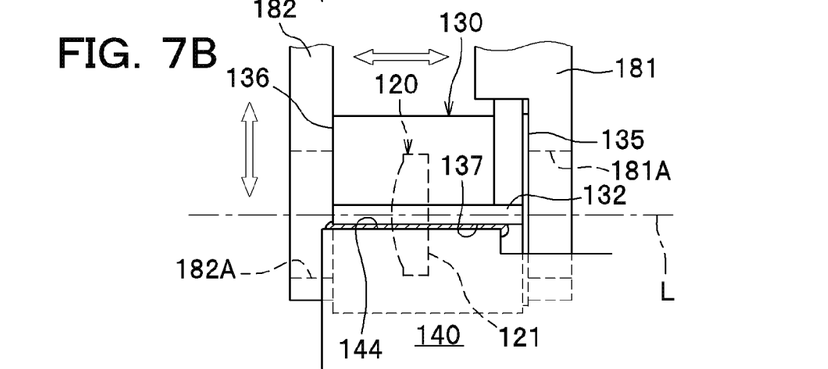

Thereafter, as best seen in FIG. 7B, while the holding member 130 is moved in the main scanning direction (i.e., direction along the front and rear sides of the drawing sheet) as well as in the sub-scanning direction (i.e., vertical direction of the drawing sheet) using the arm 180, an adjustment is made so that the optical axis of the semiconductor laser 110 (i.e., laser beam L) and the optical axis of the coupling lens 120 are matched. Further, an adjustment is made by moving the holding member 130 in the optical axis direction using the arm 180 while checking the image formation by the laser beam L, so that the position of the coupling lens 120 can be adjusted in the optical axis direction.

Figure 7C:
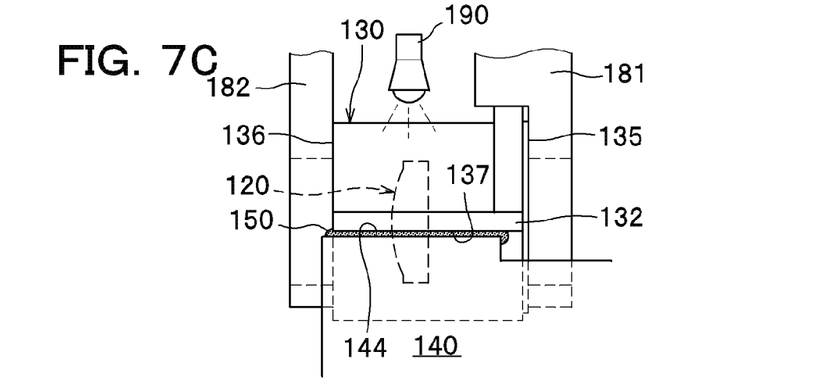

After the position of the holding member 130 (i.e., position between the semiconductor laser 110 and the coupling lens 120) is determined by this alignment process, as best seen in FIG. 7C, the adhesive 150 is irradiated and cured with ultraviolet light emitted from an ultraviolet lamp 190. Accordingly, the holding member 130 is fixed to the frame 140, and the assembly of the light source device 100 and the attachment of the light source device 100 to the base frame 50A are completed.

With the configuration of the light source device 100 according to this embodiment, the following advantageous effects can be achieved.

Since the holding member 130 has a pair of first protrusions 132 sticking out from the outer peripheral surface of the main body portion 131 at two diametrically opposite positions with the main body portion 131 disposed therebetween to define the fixing surfaces 137 lying in the same plane and fixed to the frame 140, the attachment of the holding member 130 (i.e., the pair of first protrusions 132) can be achieved in such a manner as to place the holding member 130 onto the frame-side fixing surfaces 144 of the frame 140. This configuration allows the holding member 130 to stably move in the main scanning direction and the sub-scanning direction as well as in the optical axis direction, while the holding member 130 is placed on the frame 140. Therefore, the alignment of the coupling lens 120 with the semiconductor laser 110 can be performed accurately and with ease.

Further, when the holding member 130 is fixed to the frame 140 by adhesive 150, the irradiation of ultraviolet light is required only for flat regions at which the first protrusions 132 (i.e., fixing surfaces 137) come into contact with the frame-side fixing surfaces 144. This can realize the attachment of the holding member 130 to the frame 140 with increased ease as compared with the conventional light source device in which the irradiation of ultraviolet light should be applied to the entire circumference of the barrel portion.

Especially in this embodiment, since the holding member 130 transmits ultraviolet light, the adhesive 150 can be readily illuminated with ultraviolet light through the first protrusions 132.

Further, the frame-side fixing surface 144 (i.e., surface to which adhesive 150 is applied) can be formed as a planar surface. This makes it possible to easily and uniformly apply the adhesive 150 to the frame-side fixing surfaces 144 as compared with the conventional light source device in which adhesive is applied to the entire circumference of the barrel portion. As a result, adverse effects due to contraction or expansion upon curing of the adhesive 150 can be minimized, and the alignment of the semiconductor laser 110 and the coupling lens 120 can be accurately performed.

In this embodiment, since the pair of first protrusions 132 extend along the optical axis direction, the holding member 130 is less likely to tilt during the alignment process. Therefore, the alignment of the semiconductor laser 110 and the coupling lens 120 can be more easily and more accurately performed. Further, providing the pair of first protrusions 132 extending along the optical axis direction makes it possible to ensure elongated adhesive surfaces along the optical axis direction (i.e., enlarged adhesive surfaces can be obtained), so that the holding member 130 can be firmly fixed to the frame 140.

Since the holding member 130 includes the second protrusion 133 having the protrusive end surface 138 that is parallel to the fixing surfaces 137 of the pair of first protrusions 132, the arm 180 can hold the holding member 130 with the abutment surface 183 of the arm 180 (i.e., the incident-side arm 181) contacting with the protrusive end surface 138. Therefore, the holding member 130 is less likely to rotate around the optical axis during positioning of the holding member 130, so that the alignment of the semiconductor laser 110 and the coupling lens 120 can be more easily and more accurately performed.

Since the light-incident surface 121 of the coupling lens 120 is a flat surface and the coupling lens 120 is held in the main body portion 131 such that the light-incident surface 121 is parallel to the incident-side end surface 135 and the emission-side end surface 136, when the holding member 130 is held by the arm 180, it is possible to prevent the light-incident surface 121 from tilting with respect to the incident-side end surface 135 and the emission-side end surface 136. Therefore, the alignment of the semiconductor laser 110 and the coupling lens 120 can be more accurately performed.

Since the wall 50E of the base frame 50A has the opening 50F, the positioning of the semiconductor laser 110 and the coupling lens 120 can be performed during the attachment of the light source device 100 to the base frame 50A. This makes it possible to optimally adjust the positions of the semiconductor laser 110 and the coupling lens 120 in accordance with specifications (i.e., size, etc.) of the optical scanner 5, so that the scanning accuracy of the optical scanner 5 can be improved. Further, the commonality of components (i.e., the light source device 100) can be realized between optical scanners 5 with different specifications, which can reduce the cost.

Further, since it is not necessary to install a measurement device used for the alignment process inside the base frame 50A, the size of the base frame 50A (thus the size of the optical scanner 5) can be reduced. Further, since a large-sized highly accurate measurement device can be used for positioning the semiconductor laser 110 and the coupling lens 120, the scanning accuracy of the optical scanner 5 can be improved.

Although an illustrative embodiment of the present invention has been described above, the present invention is not limited to this specific embodiment. It is to be understood that changes and modifications may be made to any of the specific configurations without departing from the scope of the present invention.

In the above-described embodiment, the pair of first protrusions 132 extend along the optical axis direction from one end to the other end of the main body portion 131. However, the present invention is not limited to this specific configuration, and the pair of first protrusions may have the length shorter in the optical axis direction than that of the first protrusions 132 of the above embodiment. For example, the pair of first protrusions may extend from a center portion of the main body portion to one end (or to the other end) of the main body portion along the optical axis direction. The pair of first protrusions may extend along the optical axis direction without reaching the both ends of the main body portion.

In the above-described embodiment, the pair of first protrusions 132 stick out from the outer peripheral surface of the main body portion 131 at two diametrically opposite positions with the center point of the substantially circular section of the main body portion 131 disposed therebetween, extending radially outward in a direction orthogonal to the optical axis direction. However, the present invention is not limited to this specific configuration. According to the present invention, as long as the fixing surfaces of the first protrusions lie in the same plane, the first protrusions may protrude at any positions and/or directions. For example, one of the first protrusions may stick out from the outer peripheral surface of the substantially cylindrical main body portion at a position shifted from the other first protrusion approximately by 150 degrees.

In the above-described embodiment, the protrusive end surface 138 (i.e., end surface) that is parallel to the fixing surfaces 137 of the pair of first protrusions 132 is provided on the second protrusion 133. However, the present invention is not limited to this specific configuration. For example, the second protrusion 133 may not be provided, and the surfaces of the first protrusions 132 opposite to the fixing surfaces 137 may be end surfaces parallel to the fixing surfaces 137. As an alternative, an end surface parallel to the fixing surfaces 137 may be provided on the outer peripheral surface of the main body portion 131. Such an end surface may not be provided on the holding member.

In the above-described embodiment, the holding member 130 is made of resin, etc. which transmits ultraviolet light. However, the present invention is not limited to this specific configuration, and the holding member may be made of resin or glass which transmits visible light. In this instance, the holding member can be fixed to the frame using adhesive which is cured by irradiation of visible light. The holding member may be made of a material which does not transmit ultraviolet light or visible light.

In the above-described embodiment, the holding member 130 is fixed to the frame 140 by adhesive 150. However, the holding member may be fixed by screws or the like.

In the above-described embodiment, the lid frame 50B has a pair of shielding walls 50M, 50N oppositely extending to sandwich the wall 50E and cover the opening 50F. However, the present invention is not limited to this specific configuration. For example, the shielding walls 50M, 50N may not be provided. In this instance, the opening 50F may be closed by a sticker, etc. However, providing the pair of shielding walls on the lid frame makes it possible to simplify the assembly process of the optical scanner as well as to reduce the cost.

In the above-described embodiment, the base frame 50A has the wall 50E (i.e., wall opposite to the light source device with the light deflector interposed between the light source device and the wall), and the opening 50F in the form of a through-hole is formed in the wall 50E. However, a slit-like opening or a notch-like opening may be formed in the wall. Of course, the opening may not be formed in the wall.

In the above-described embodiment, the semiconductor laser 110 is used as an example of a light source. However, a solid-state laser such as YAG laser may be employed.

In the above-described embodiment, the light source device 100 is assembled (manufactured) during the attachment of the light source device 100 to the base frame 50A. However, the present invention is not limited to this specific embodiment. For example, the light source device 100 may be assembled in advance, and the thus assembled light source device 100 is attached to the optical scanner or the like.

In the above-described embodiment, the polygon mirror 53 is used as an example of a light deflector; the polygon mirror 53 has rotatable reflecting surfaces for deflecting the laser beam (i.e., light) and rapidly sweeping with the laser beam. However, the present invention is not limited to this specific configuration. For example, the polygon mirror 53 may be replaced with a vibrating mirror having a reflecting surface which vibrates to deflect the laser beam and rapidly sweep with the laser beam.

In the above-described embodiment, the laser printer 1 is used as an example of an image forming apparatus. However, the present invention is applicable to other image forming apparatuses such as a copying machine and multifunction peripheral.

In the above-described embodiment, the optical scanner according to the present invention is applied to an image forming apparatus (i.e., laser printer 1). However, the present invention is not limited to this specific embodiment, and the optical scanner is applicable to a measurement device or an inspection device. Further, in the above-described embodiment, the light source device according to the present invention is applied to the optical scanner 5. However, the present invention is not limited to this specific embodiment, and the light source device is applicable to a measurement device or an inspection device.

What is claimed is:

1. A light source device comprising:
   a light source;
   a coupling lens configured to convert light emitted from the light source into a beam of light;
   a holding member configured to hold the coupling lens; and
   a frame to which the holding member is fixed,
   wherein the holding member comprises a tubular main body portion for holding the coupling lens, and a pair of first protrusions sticking out from an outer peripheral surface of the main body portion;
   wherein the pair of first protrusions have fixing surfaces lying in the same plane and fixed to the frame;
   wherein the frame has a pair of fixing surfaces for placing the pair of first protrusions, and the pair of fixing surfaces are spaced apart from each other; and
   wherein the tubular main body portion of the holding member is spaced apart from the frame.

2. The light source device according to claim 1, wherein the pair of first protrusions extend along an optical axis direction.

3. The light source device according to claim 1, wherein the holding member further comprises a second protrusion sticking out from the outer peripheral surface of the main body portion in a direction orthogonal to an optical axis direction and having an end face parallel to the fixing surfaces of the pair of first protrusions, and wherein the end face serves as an abutment face, against which a holding part, configured to hold the holding member and to fix the holding member to the frame, abuts upon assembling the holding member with the frame.

4. The light source device according to claim 1, wherein both end faces of the main body portion in an optical axis direction define surfaces orthogonal to the optical axis direction, and wherein one lens surface of the coupling lens is a flat surface, and the coupling lens is held in the main body portion such that the lens surface is parallel to the both end faces of the main body portion.

5. An optical scanner comprising:
   the light source device of claim 1;
   a light deflector configured to deflect a beam of light from the light source device and rapidly sweep with the beam of light;
   a scanning lens disposed to allow the beam of light deflected by the light deflector to pass through;
   a base frame shaped like a box and configured to support therein the light source device; and
   a lid frame attached to and covering the base frame.

6. The optical scanner according to claim 5, wherein the base frame has a wall opposite to the light source device with the light deflector interposed between the light source device and the wall, and the wall has an opening through which the beam of light from the light source device is allowed to pass during assembly of the optical scanner.

7. The optical scanner according to claim 6, wherein the lid frame has a pair of shielding walls extending to sandwich the wall of the base frame to cover both sides of the opening.

8. The light source device according to claim 1, wherein the holding member is fixed to the frame by adhesive interposed between the first protrusions and the frame.

9. The light source device according to claim 8, wherein at least the first protrusions of the holding member transmits ultraviolet light or visible light.

10. The light source device according to claim 9, wherein the adhesive comprises a light curing resin.

11. The light source device according to claim 1, wherein the frame has a pair of holding member fixing portions by which the fixing surfaces for placing the pair of first protrusions are defined, and wherein the holding member fixing portions protrude from the frame toward the pair of first protrusions of the holding member.

* * * * *